(12) United States Patent
Dev et al.

(10) Patent No.: US 9,955,173 B2
(45) Date of Patent: Apr. 24, 2018

(54) TRANSPARENCY INFORMATION RETENTION

(71) Applicant: Cisco Technology Inc., San Jose, CA (US)

(72) Inventors: Abhijeet Dev, Paris (FR); Yun Yaw Chu, Orly (FR)

(73) Assignee: Cisco Technology Inc., San Jose, CA (US)

(*) Notice: Subject to any disclaimer, the term of this patent is extended or adjusted under 35 U.S.C. 154(b) by 377 days.

(21) Appl. No.: 14/147,778

(22) Filed: Jan. 6, 2014

(65) Prior Publication Data

US 2015/0195544 A1    Jul. 9, 2015

(51) Int. Cl.
| | | |
|---|---|---|
| *G06T 15/00* | (2011.01) | |
| *H04N 19/186* | (2014.01) | |
| *H04N 19/463* | (2014.01) | |
| *H04N 19/44* | (2014.01) | |
| *H04N 19/136* | (2014.01) | |
| *G09G 5/02* | (2006.01) | |
| *H04N 9/76* | (2006.01) | |

(Continued)

(52) U.S. Cl.
CPC ............. *H04N 19/186* (2014.11); *G09G 5/02* (2013.01); *H04N 9/76* (2013.01); *H04N 19/136* (2014.11); *H04N 19/182* (2014.11); *H04N 19/44* (2014.11); *H04N 19/46* (2014.11); *H04N 19/463* (2014.11); *G09G 2340/02* (2013.01); *G09G 2340/125* (2013.01)

(58) Field of Classification Search
CPC .... H04N 19/186; H04N 19/463; H04N 19/44; H04N 19/136; H04N 9/76; H04N 19/46; H04N 19/182; G09G 2340/125; G09G 2340/02; G09G 5/02

USPC ................. 345/592, 426, 619, 629
See application file for complete search history.

(56) References Cited

U.S. PATENT DOCUMENTS 7,129,956 B2 *   10/2006   Hollis .................. G06T 15/005
                                                        345/582
7,643,032 B2 *    1/2010   Wetzel .................. G09G 3/003
                                                        345/428

(Continued)

FOREIGN PATENT DOCUMENTS

CN          102821279 A      12/2012
EP             2204773 A1     7/2010

(Continued)

OTHER PUBLICATIONS

Adobe, "Adjusting the Layers and Creating a Track Matte in Adobe After Effects CC," May 2013, pp. 1-3.*

(Continued)

*Primary Examiner* — Phu K Nguyen
(74) *Attorney, Agent, or Firm* — Ronald Fernando

(57) ABSTRACT

Systems and methods are disclosed for constructing video image frames including transparency information. Certain embodiments provide for accessing a first frame of digital data associated with a pixel of an image representation, the frame comprising a set of transparency data bits, a set of red data bits, a set of green data bits, and a set of blue data bits. A second frame is constructed comprising a single transparency data bit, a reduced set of red data bits, the set of green data bits; and the set of blue data bits, wherein the second frame is provided to a destination device.

20 Claims, 7 Drawing Sheets

(51) Int. Cl.
*H04N 19/46* (2014.01)
*H04N 19/182* (2014.01)

(56) References Cited

U.S. PATENT DOCUMENTS

| | | |
|---|---|---|
| 7,852,353 B1 | 12/2010 | Haskell et al. |
| 8,170,357 B2 | 5/2012 | Kim et al. |
| 8,260,078 B2 | 9/2012 | Kalman |
| 8,878,867 B2 * | 11/2014 | Sundbom ............... G09G 5/026 345/592 |
| 2003/0184556 A1 | 10/2003 | Hollis et al. |
| 2007/0263937 A1 | 11/2007 | Rizko |
| 2009/0110305 A1 | 4/2009 | Fenney |
| 2010/0177962 A1 | 7/2010 | Kalman |
| 2011/0228096 A1 | 9/2011 | Friel et al. |
| 2012/0120085 A1 | 5/2012 | Kanalakis, Jr. et al. |
| 2013/0047150 A1 | 2/2013 | Malasky et al. |
| 2013/0293537 A1 | 11/2013 | Gaude et al. |

FOREIGN PATENT DOCUMENTS

| | | |
|---|---|---|
| EP | 2541942 A1 | 1/2013 |
| EP | 2675171 A1 | 12/2013 |

OTHER PUBLICATIONS

Propst, Matt, "How to Export a Transparent Movie from After Effects," Nov. 2009, pp. 1-4.*
Extended European Search Report for corresponding application EP14194770 dated May 13, 2015.
WebM, "Alpha Channel," 4 pages; http://wiki.webmproject.org/alpha-channel.

* cited by examiner

TRANSPARENCY INFORMATION RETENTION

TECHNICAL FIELD

The present description relates generally to video image transmission.

BACKGROUND

Transmission of video content between devices over a communication network may be performed on a pixel-by-pixel, or frame-by-frame, basis, wherein frames of image data are transmitted containing various amounts and/or types of information. In addition to color information, certain communication protocols allow for inclusion in a video transmission of transparency information, which may be used to generate composite images. However, certain devices and/or systems may not be configured to support transmission of such transparency information in a practical or desirable manner.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

Figure 1:
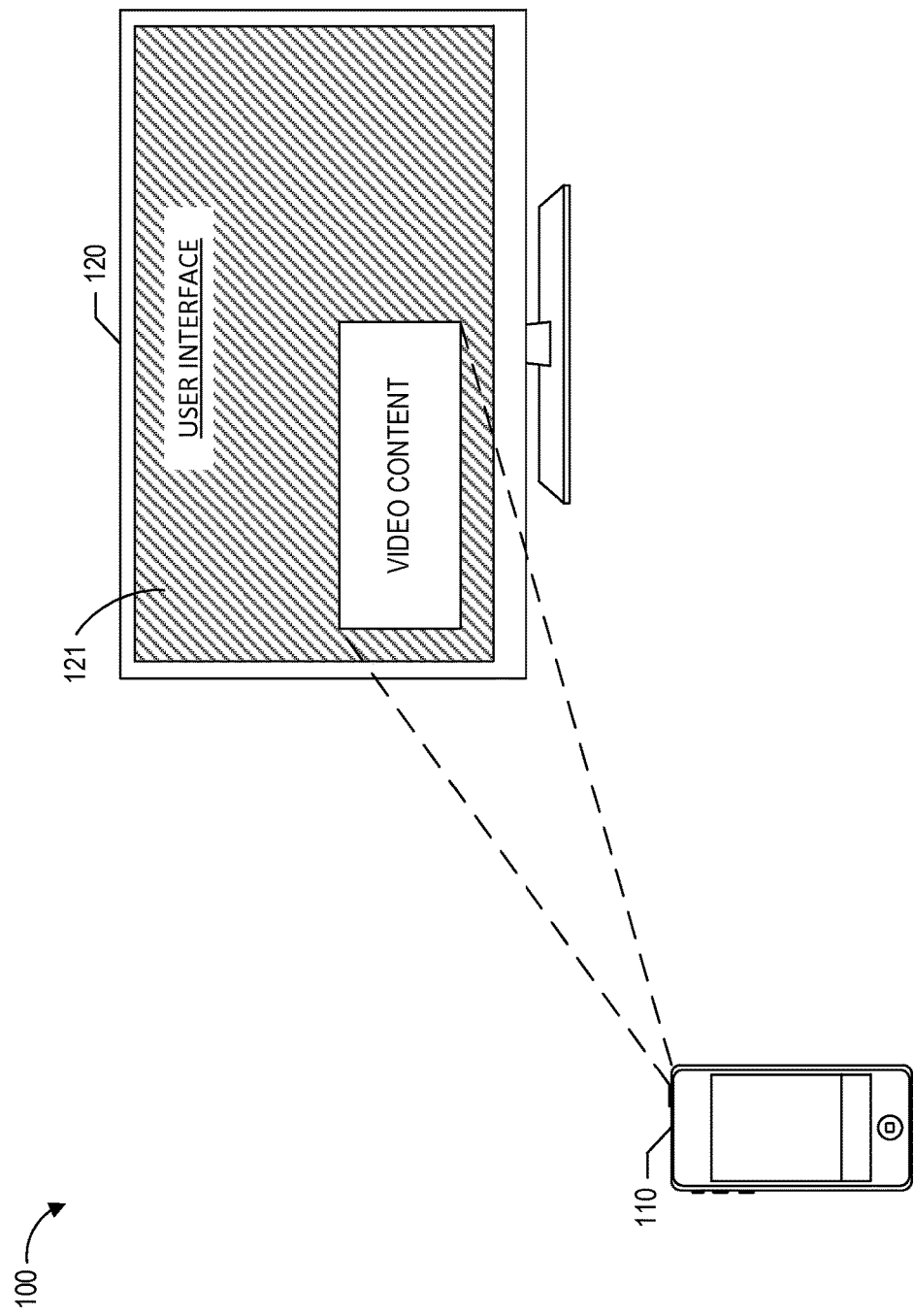
FIG. 1 illustrates a video streaming system according to one or more embodiments.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or device admitted by the specification. Finally, like reference numerals are used to denote like features throughout the specification and figures.

DESCRIPTION OF EXAMPLE EMBODIMENTS

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Certain embodiments disclosed herein provide a process of managing transparency information by a controller including a non-transitory memory, the process including accessing a first frame of digital data associated with a pixel of an image representation, the frame consisting of a first number of bits of data and including: a set of transparency data bits representative of transparency information associated with the pixel; a set of x number of red data bits representative of red color information associated with the pixel; a set of green data bits corresponding to green color information associated with the pixel; and a set of blue data bits corresponding to blue color information associated with the pixel. The process may further include constructing a second frame of digital data associated with the pixel, the frame consisting of a second number of bits of data and including: a single transparency data bit of the set of transparency data bits; a reduced set of red data bits consisting of (x−1) number of bits of the set of red data bits; the set of green data bits; and the set of blue data bits. In certain embodiments, the process includes providing the second frame of digital data to a destination device. The second number may be less than the first number.

Certain embodiments disclosed herein provide a process of managing transparency information by a controller including a non-transitory memory, the process including receiving a first frame of digital data associated with a pixel of an image representation, the frame consisting of a first number of bits of data and including: a transparency data bit representative of transparency information associated with the pixel; a set of red data bits representative of red color information associated with the pixel; a set of green data bits representative of green color information associated with the pixel; and a set of blue data bits representative of blue color information associated with the pixel. The process may further include constructing a second frame of digital data associated with the pixel, the frame consisting of a second number of bits of data and including: a set of transparency data bits including the transparency data bit and one or more additional transparency data bits; an increased set of red data bits including the set of red data bits and one or more additional red data bits; the set of green data bits; and the set of blue data bits. In certain embodiments, the process includes causing the second frame of digital data to be displayed on a digital display device. The second number may be greater than the first number.

Certain embodiments disclosed herein provide a system including a source computing device and a destination computing device. The source computing device may be configured to access a first frame of digital data consisting of four bytes of data and including a byte of transparency data, a byte of red data, a byte of green data, and a byte of blue data. The source computing device may be further configured to construct a second frame consisting of three bytes of data and including a bit of transparency data, seven bits of red data, the byte of green data, and the byte of blue data. In certain embodiments, the source computing device is further configured to encode the second frame using an encoder and provide the second frame of digital data to the destination computing device.

The destination computing device may be configured to receive the second frame of digital data, decode the second frame using a decoder, and construct a third frame consisting of four bytes of data and including a reconstructed byte of transparency data, a reconstructed byte of red data, the byte of green data, and the byte of blue data. The destination computing device may be further configured to cause the third frame to be displayed on a digital display device.

Transparency Information Transmission

Digitization of video images is used in various applications, such as global communication (e.g., videoconferencing), digital video recording (DVDs, SVCDs, PVRs, etc.), video broadcasting (e.g., television) and the like, wherein video information and/or associated audio information is transmitted across communication links or stored in electronic form. For efficient transmission, reception, and storage of video data, encoding and compression of video and/or accompanying audio data may be necessary or desirable. Video compression coding can provide for encoding of digital video data such that less memory may be required to store the video data, and less transmission bandwidth may be required to transmit the video data. Various compression/decompression schemes may be used to compress video frames to achieve such results.

Certain video encoding and compression standards have been designed for particular applications, such as ITU-T standards H.261 and H.263, which generally used in video conferencing applications, as well as various standards promulgated by the Moving Picture Experts' Group (e.g., MPEG-1 and MPEG-2), which are generally used in various consumer electronics applications. One specific application is the ITU-T H.264 standard, which shares various common elements with the Moving Picture Experts' Group MPEG-4 standard, or Advanced Video Coding (AVC), and is designed for streaming media and broadcast television applications, among others.

In some cases, it is desirable to construct an image (or sequence of images) as a composite or an overlay combination of two different images. For example, images or video streams may be layered together using color keying (i.e., chroma keying), or some other digital image-manipulation mechanism, to create a singular image. In order to generate the composite image, alpha compositing may be implemented wherein certain pixels associated with a particular source may be associated with an "alpha" value that indicates some degree of transparency for the pixel, while other pixels associated with the source may have an alpha value corresponding to complete opacity. Alpha values may be arranged to create a "mask" image, which may be included in a separate channel, or as part of the primary video image channel. Alpha compositing may be used, for example, when combining computer-rendered image elements (i.e., a computer-generated user interface) with a video stream. For a foreground image source (e.g., video content), pixels having transparent alpha values may allow a background image (e.g., a user interface) to be displayed at the position of the transparent pixels, while the pixels having a fully opaque alpha value may substantially prevent the background from showing at the position of the opaque pixels, and instead show the foreground image.

As originally drafted, the H.264 standard did not include the capabilities for transparency (i.e., alpha channel) support. However, to accommodate a wider variety of applications, extensions to the standard have been developed providing transparency functionality. In certain embodiments, H.264-compliant compression/encoding modules are configured to operate on 720p RGB data, compress to H.264, and encapsulate in an MPEG transport stream before streaming over Internet protocol. Mechanisms for incorporating transparency information in video frames are described herein. Certain embodiments are described herein in terms of the ITU-T H.264/AVC standard for illustration purposes. However, the principles disclosed herein may be implemented with respect to other standards and/or technologies.

Transparency support may be desirable for various audio-video container formats, such as MP4, WebM, and the like. However, encoders and decoders used in connection with such formats may not include transparency information handling capability. Therefore, where encoding/decoding processes are inaccessible to the user, it may be impractical or impossible to provide full alpha channel communication. Certain embodiments disclosed herein provide for transparency information communication without the need for explicit alpha channel encoder/decoder handling capability.

Various approaches may be used by content producers to implement transparency functionality, such as chroma keying, or the use of a specific color, such as black (e.g., RGB (0,0,0)) or green (e.g., RGB (0,255,0)) to determine opacity of a pixel. However, such solutions may require ignoring a chroma range, and may likewise be unsuitable for generic content. Furthermore, lossy compression/decompression processes may change such values, and therefore it may be necessary for rendering software to implement logic to adapt to such variability. Certain embodiments disclosed herein provide for transparency information communication without restraining the use of pixel values by embedding transparency information in video content frames. Embodiments disclosed herein may advantageously allow for transmission of video content representing user interface (UI) graphic elements. Furthermore, embedding transparency information as described herein may allow for transparency communication without the need for transmitting a separate transparency image.

Screencasting

Embodiments disclosed herein may advantageously be applicable in certain peer-to-peer screencasting ("mirroring") applications, such as with device communications over Miracast, or other peer-to-peer wireless screencasting protocol. In certain mirroring applications, it may be desirable to implement alpha compositing, as described above. FIG. 1 illustrates an embodiment of a video streaming system 100 in which video content from a source device 110, such as a smartphone, is streamed wirelessly to a destination device 120, such as a video display device, or computing device communicatively coupled to a video display device.

When streaming video content from a source device, it may be desirable to combine the video stream with one or more visual effects or graphics. For example, in certain embodiments, streaming video content is displayed in combination with a graphical user interface, which may be used to enhance the presentation of the video content in some respect. In order to achieve such image compositing, it may be necessary or desirable to transmit transparency data with the streaming video data in order to control which region(s) of the display screen 121 will display the video content. However, in certain embodiments, such streaming video content may be transmitted through a H.264 encoder/decoder chain that does not support transparency.

Video Transmission System

Figure 2:
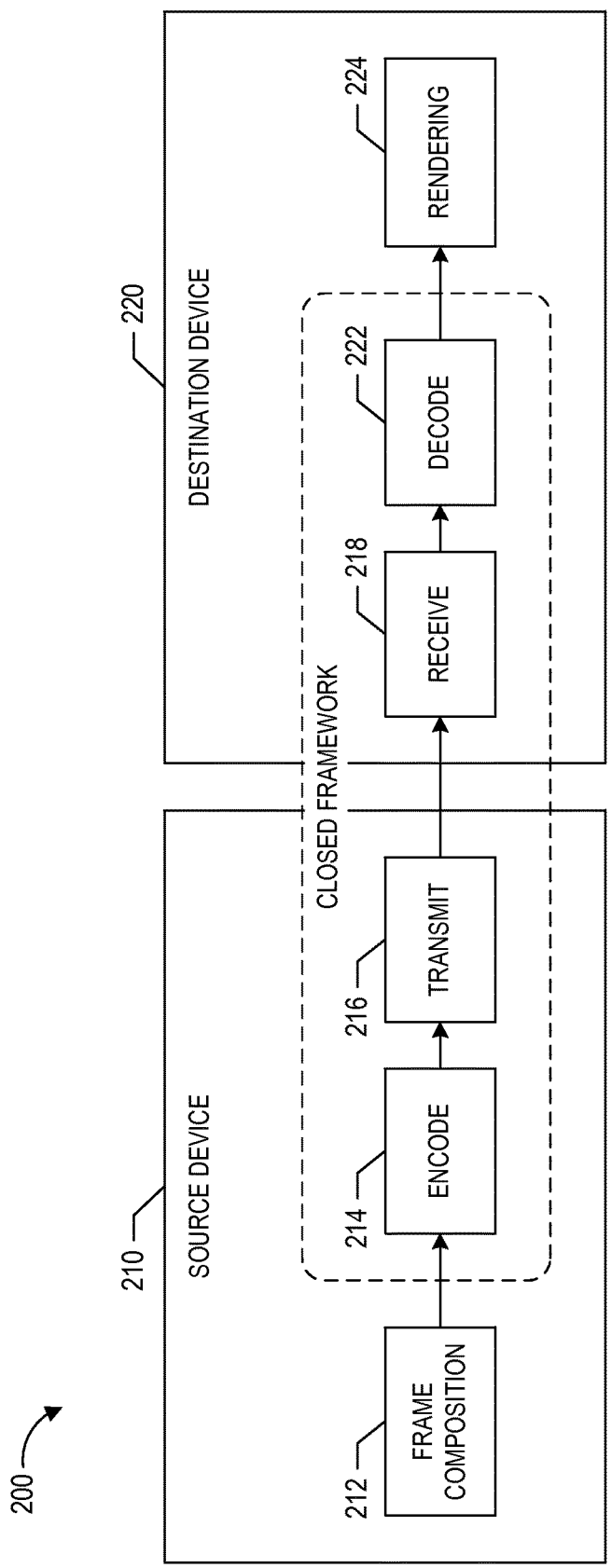
FIG. 2 illustrates a video content transmission system according to one or more embodiments.

Potential problems associated with the lack of support for transparency may be understood with reference to FIG. 2, which illustrates a video streaming system 200 according to one or more embodiments. The system includes a source device 210 and a destination device 220. The source and destination devices may be any suitable or applicable computing devices configured to communicate over a data communication network. For example, the source device 210 may be a mobile computing device, such as a laptop computer, tablet computer, smartphone, etc.

The diagram of FIG. 2 illustrates a video transmission chain, wherein certain modules/components configured to execute the video content handling/transmission are associated with the source device 210, and certain modules/components are associated with the destination device 220. Specifically, the source device may be configured to organize video data into digital data transmission frames for transmission between the source device 210 and destination device 220. Once the frames have been constructed, they are passed to an encoder module 214 configured to convert the frames to a compressed format for transmission. In certain embodiments, the encoder operates at an intermediate frequency (i.e., baseband), wherein the signal containing the frame information is up-converted to the carrier frequency downstream for transmission. Compressed frames are provided to a transmitter module 216 for performing transmission of the frames to the destination device 220. The transmitter may include one or more radio frequency (RF) power amplifiers and/or antennas and may be configured to wirelessly transmit the frames using a wireless communication protocol, such as Bluetooth, or the like.

The destination device 220 may include a receiver module 218, which may include one or more antennas and/or low-noise amplifiers for receiving and treating the transmitted signal. The destination device 220 may further decode the received signal at a decoder module 222. The decoded frames are then rendered by the destination device for presentation thereof.

It may be desirable to provide per-pixel transparency information using the transmit chain shown in FIG. 2. However, in certain embodiments, the encoder/decoder may not implement the appropriate protocol (e.g., H.264) extensions that support the transmission of transparency or alpha information. Furthermore, the encoder/decoder portions of the chain may be part of a closed framework, wherein the operation of such modules is outside the control of the developer. For example, such cases may occur when there is no direct access to the hardware encoder at the source side of the stream and/or the decoder on the destination side, and where the hardware encoder/decoder supports a limited subset of standard video resolutions. Examples of such systems may include systems providing support for "mirroring" functionality, such as systems supported in Miracast, or other in-home entertainment and/or sharing technologies.

Certain embodiments disclosed herein provide for manipulation of video image frames prior to encoding by the software module sending the frame. The module receiving the frame can further modify the frame after decoding, but prior to frame rendering. In certain embodiments, such a process may allow for maintenance of transparency of overlaid content (e.g., embedded processor graphics (EPG) content, or any other content) on a regular video playback. For example, the overlaid content may be transmitted by a handheld device as H.264 media embedded in a MPEG-2 transport stream, comprising combined user interface elements with graphical effects. Certain embodiments disclosed herein provide for mapping the source content down from a full RGB 8:8:8 space to one that uses reduced pixel depth for one or more of the components. For EPG or graphics content, this reduction in color fidelity may be chosen to have little or substantially no impact on the content from a visual perspective. In certain embodiments, 1-bit transparency of an ARGB (alpha/reg/green/blue) 8:8:8:8 frame undergoing transmission as a bitstream is retained by modifying the frame and constructing a 24-bit-per-pixel frame to pass through the lossy encode-decode cycle.

As opposed to methods that are implemented on the bitstream encoders and decoders, systems and methods disclosed herein provide for software solutions that may be implemented outside of the encoding/decoding processes. This may be advantageous as software vendors often do not have control over the process in certain handheld devices. Therefore, embodiments disclosed herein may advantageously support software built for handheld devices with hardware encoding/decoding that does not support embedding alpha information in the encoded media.

Figures 3A, 3B:
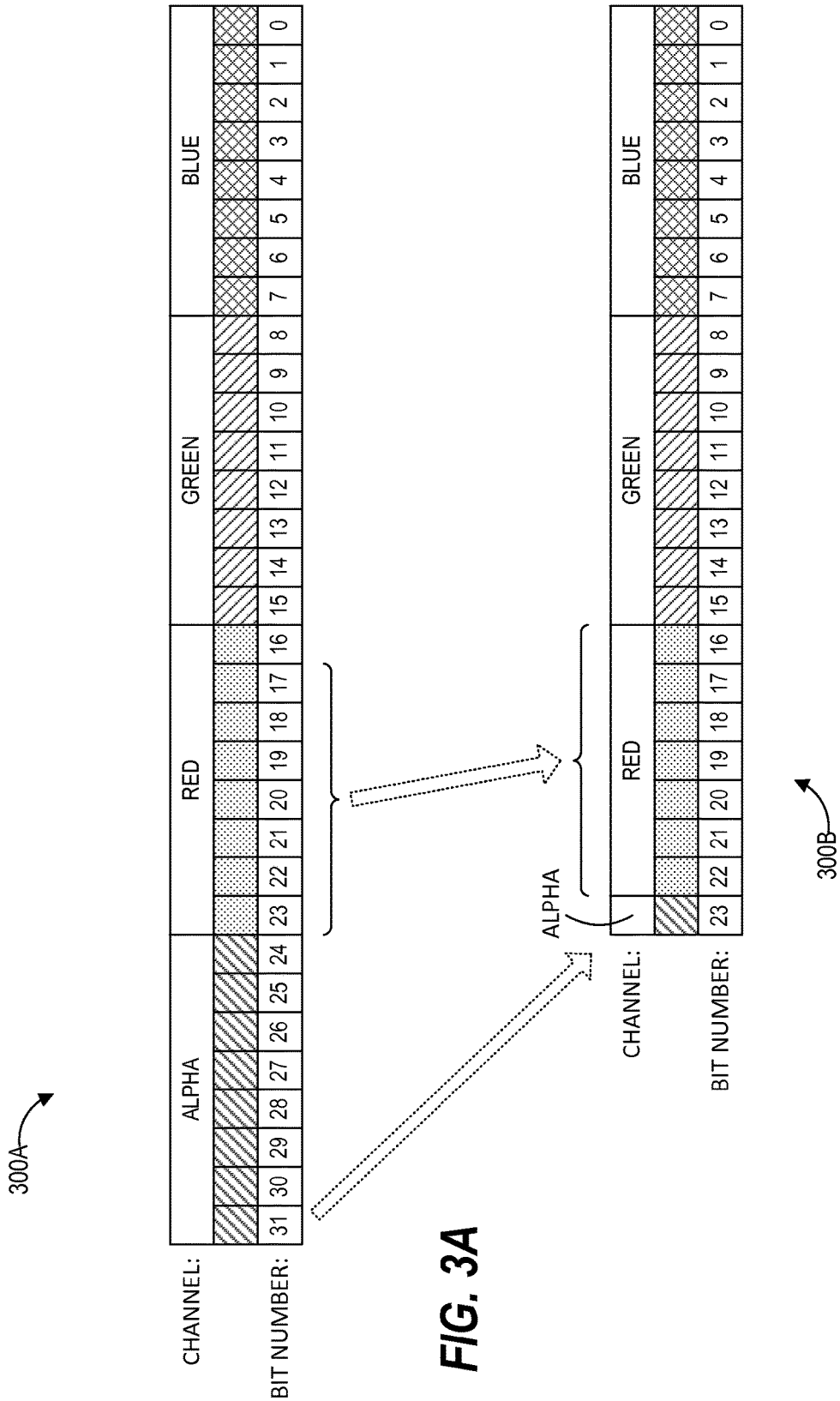
FIGS. 3A and 3B illustrate diagrams representing frames of data according to one or more embodiments.

FIGS. 3A and 3B illustrate diagrams representing frames of data according to one or more embodiments. FIG. 3A illustrates a standard ARGB 8:8:8:8 frame, including a byte each representative of transparency data, red color data, green color data and blue color data. While certain embodiments are disclosed herein in the context of ARGB frame format, the disclosed principles may also be applicable to other formats, such as RGBA. In certain embodiments, a multi-bit alpha value is contained in the frame 300A providing transparency information associated with the pixel, where a value equal to 0 (e.g., '00000000') represents complete transparency, such that the pixel is effectively masked, and a value equal to 255 (e.g., '11111111') represents complete opacity. Values in between 0 and 255 may specify degrees of transparency.

In certain embodiments, the bits of the various channels of the frame 300A increase in significance from right to left. The frame 300A may provide image information for a single pixel of a 1280×720 pixel image. Certain embodiments disclosed herein provide for color downsampling and reordering of channel values in order to generate a reduced frame containing transparency and color information (RGB). For example, as shown in FIG. 3B, a reduced frame 300B may include approximately 3 bytes of data, as opposed to the original 4 byte frame 300A. Color downsampling and reordering of channel values may be performed on a graphics processing unit (GPU) of the source device 210 of FIG. 2. For example, computation may be performed using Renderscript, or another suitable operating system component.

As shown, the reduced frame 300B may be constructed at least in party by right-shifting the 'R' channel by 1 position to reduce the width of the 'R' channel from 8 bits to 7 bits. In addition, the alpha channel may be right-shifted by 7 positions to reduce the width of the alpha channel from 8 bits to 1 bit of data. Therefore, the resulting frame 300B may comprise a 1-bit alpha channel, a 7-bit 'R' channel, as well as the original 'G' and 'B' channels. While certain embodiments are described in the context of a reduced 'R' channel, which may provide desirable or acceptable visual effects under certain conditions, the principles disclosed herein may alternatively be implemented with reduced 'G' or 'B' channels.

The reduction from 32 bits to 24 bits illustrated in FIGS. 3A and 3B may be desirable in embodiments in which the relevant encoder expects a 24-bit frame (e.g., a standard RGB 8:8:8 frame). However, the frame 300B, while consisting only of 24 bits, also includes transparency information. In certain embodiments, the encoder does not distinguish between the frame 300B and a standard RGB 8:8:8 frame. In certain embodiments, placing the transparency bit in the most significant bit position may allow for the transparency information to survive compression/decompression processes.

Transparency Information Embedding Processes

Figure 4:
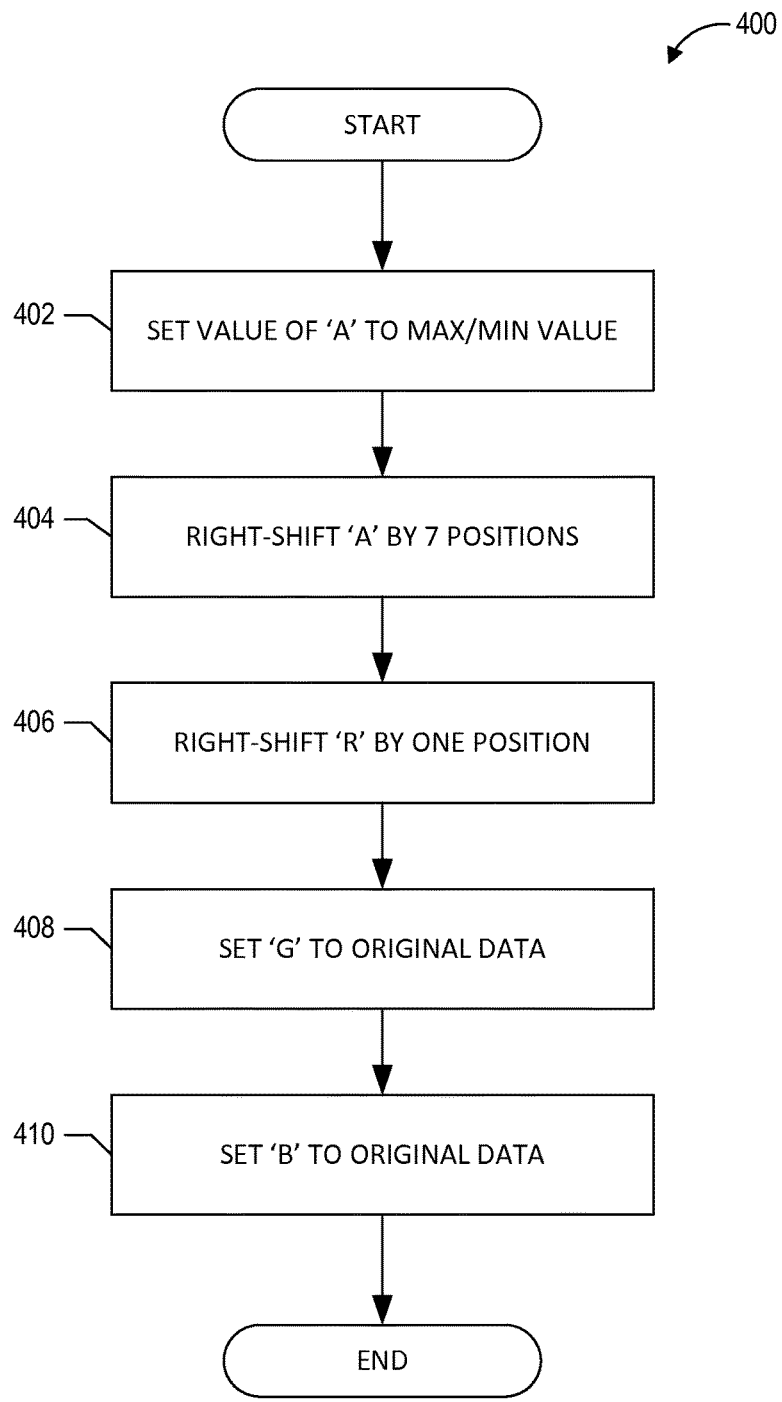
FIG. 4 illustrates a flow diagram for a process for constructing a frame including transparency information according to an embodiment.

FIG. 4 illustrates a flow diagram for a process 400 for constructing a frame including transparency information according to an embodiment. The process 400 may be performed at least in part by the source device 210 described above in connection with FIG. 2. As described, in certain embodiments, the encoding process on the source device may be closed to external access, such that it does not expose any interface to modify or to add embedded data to the encoded stream. Therefore, solutions requiring modified implementation on the encoder may not be available to embed transparency data. However, where carrying synchronized transparency information is desired, the process 400 may allow for construction of a reduced transparency-carrying frame for transmission over a encoder/decoder chain. Transparency information embedding may be applied on each frame, such that the temporal compression efficiency may remain substantially unaffected. In certain embodiments, spatial compression efficiency is slightly, though acceptably, reduced.

The steps of the process 400 may be performed on a per-pixel bases in sequence before sending the frame to the encoder. The process 400 may involve replacing the 32-bit ARGB pixel date of a standard ARGB frame with reduced-size transparency and color information. For example, the process 400 may involve setting the alpha value to a maximum (or minimum) value (e.g., a value equal to 255) at block 402 and storing the most significant bit of the alpha value in the original 'R' channel (404). For example, the alpha bit may be stored in the position of the most significant bit of the 'R' channel.

The 7 most significant bits of the 'R' channel may be carried over to the reduced frame, such that the 8 bits formerly dedicated to the 'R' channel comprise 7 bits of the former 'R' channel, as well as a single transparency bit. In certain embodiments, the reduced frame includes the full 8 bit 'G' channel and 'B' channel. The process 400 may be performed at least in part using mobile device software supporting streaming video to a controlled display device, wherein the process 400 can allow for the transmission of transparency information in the stream.

Figure 5:
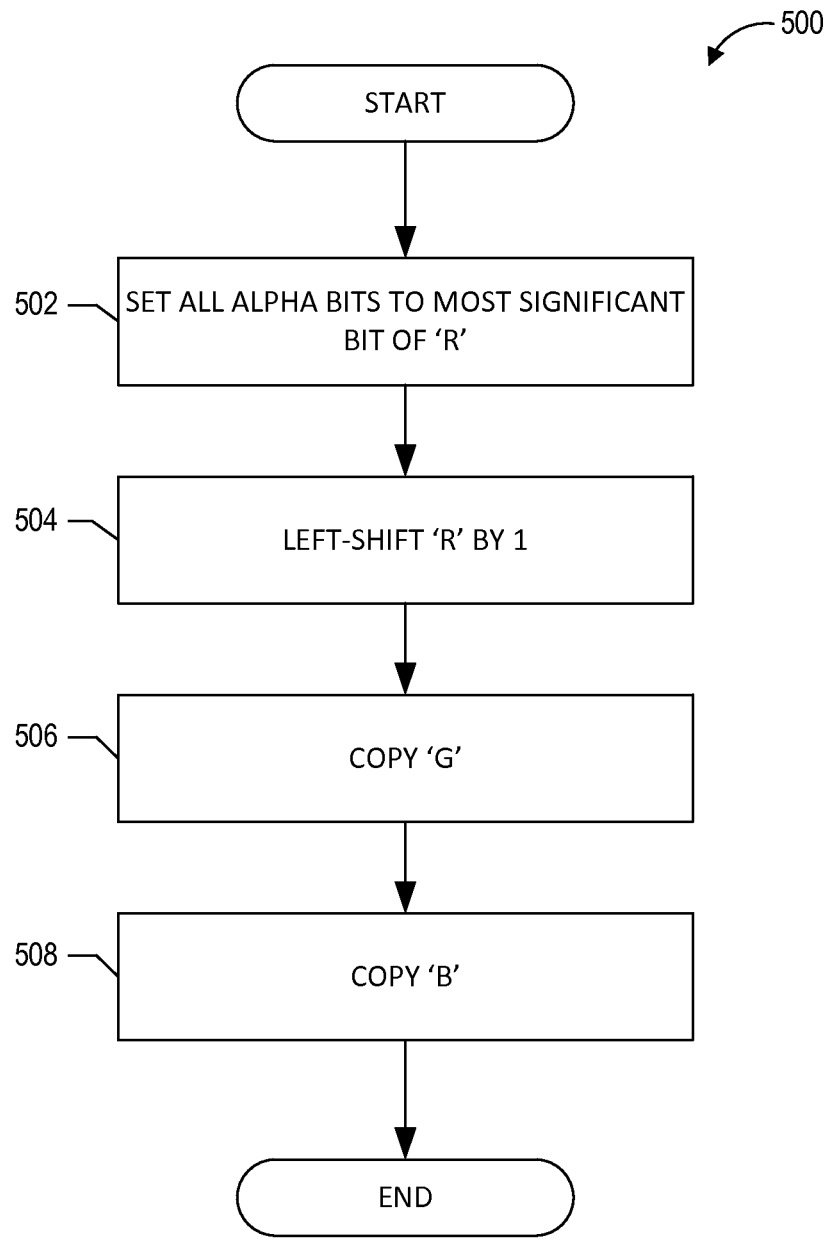
FIG. 5 illustrates a flow diagram for a process for constructing a frame including transparency information according to an embodiment.

FIG. 5 illustrates a flow diagram for a process 500 for reconstructing a 32-bit frame from the reduced 24-bit frame described above. The process 500 may be performed at least in part by the destination device 220 described above in connection with FIG. 2. As described above, the most significant bit (or other position) of the 'R' channel may contain transparency information. Therefore, the process 500 includes setting all the expanded alpha channel bits to the value of the single transparency bit. The process 500 further involves left-shifting the 7 bits of 'R' color data by one position to generate an 8-bit value. For example, the newly-generated 'R' bit may correspond to a least-significant bit of the 8-bit 'R' channel.

With respect to the 'G' and 'B' channels, such channels may have been transmitted in their entirety, and therefore, may be copied to the expanded 4-byte frame. Therefore, the resulting frame may include 8 bits each for the alpha, 'R,' 'G' and 'B' channels. The process 500 may be performed at least in part by a networked stream display devices (e.g. set-top boxes, HDMI stick, smart TVs, etc.), wherein the process 500 may allow for a stream encoded as described herein to be displayed, on top of an existing video, with random selection of coordinates for information and/or graphics.

Figure 6:
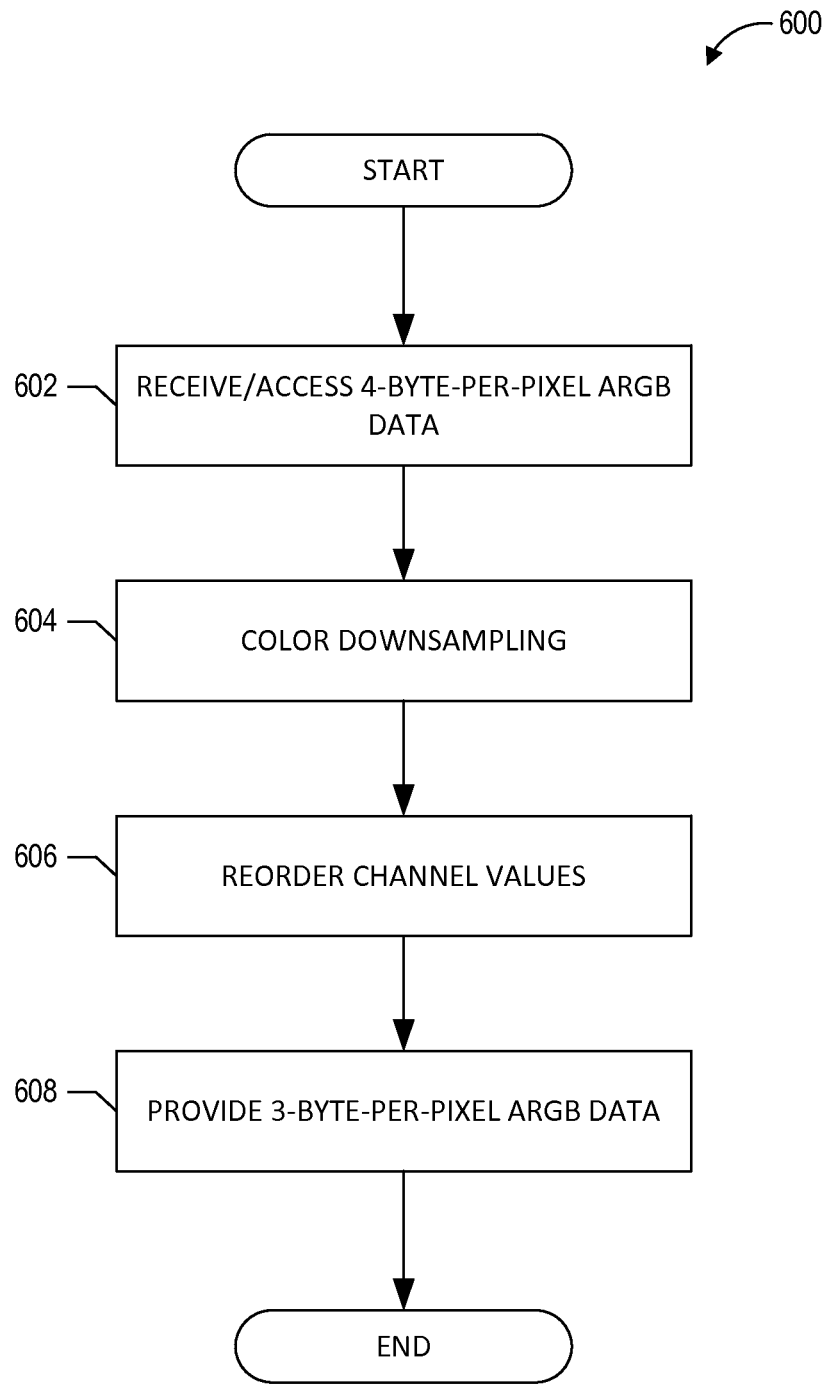
FIG. 6 illustrates a flow diagram for a process for formatting image data by a source device according to an embodiment.

FIG. 6 illustrates a flow diagram for a process for formatting image data by a source device according to an embodiment. The process 600 may be performed at least in part by the source device 210 described above in connection with FIG. 2. The process 600 involves receiving and/or accessing a 32-bit ARGB frame, which may comprise 8 bits dedicated to each of the alpha, 'R,' 'G' and 'B' channels. Prior to encoding, the process 600 involves executing color down-sampling and reordering of channel values, such as described above, and thereby generating a 24-bit reduced frame. At block 608, the process 600 involves providing the reduced frame to, for example, a decoder, which may be a component of the source device. The encoder may transparently encode the frame and transmits to a destination device.

Figure 7:
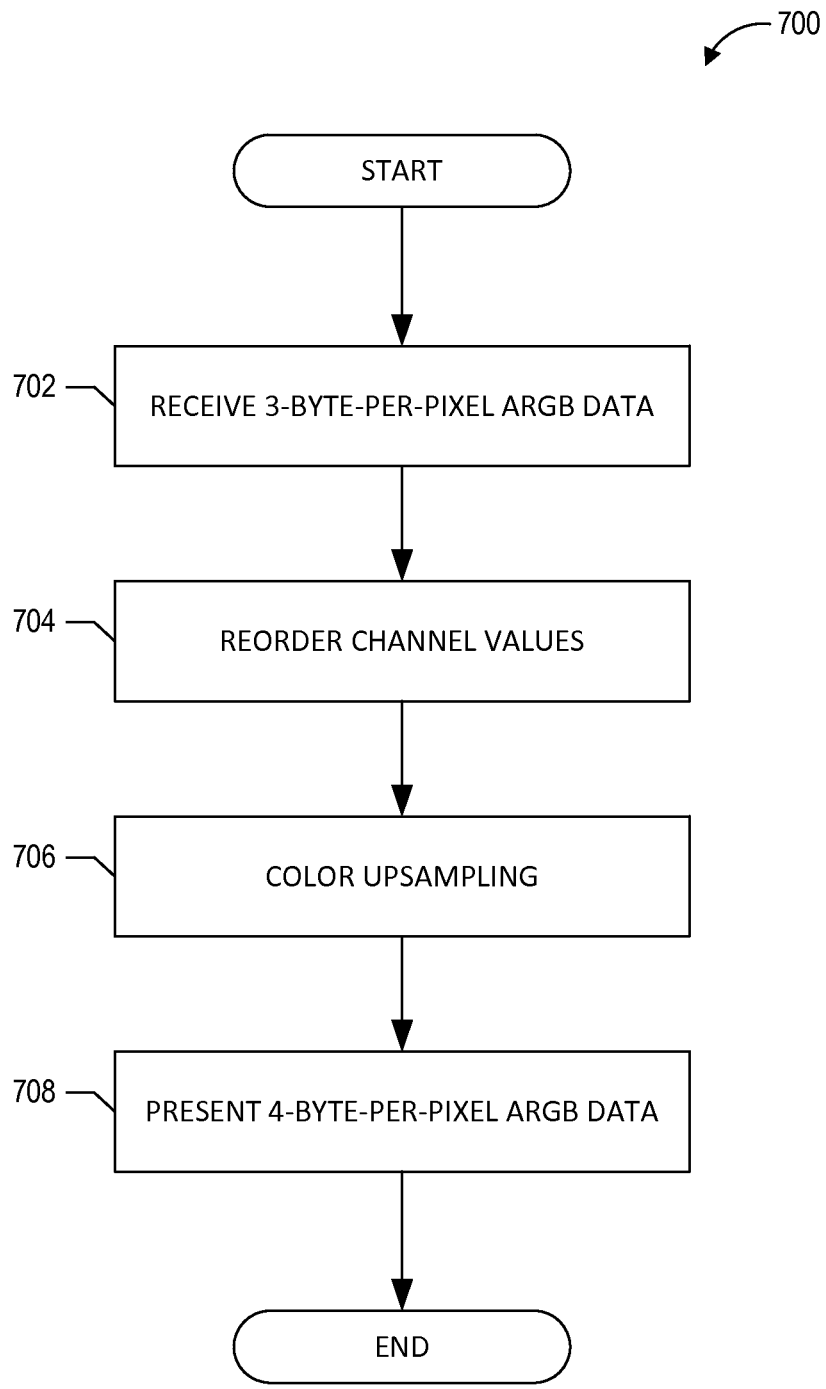
FIG. 7 illustrates a flow diagram for a process for rendering image data by a destination device according to an embodiment.

FIG. 7 illustrates a flow diagram for a process for rendering image data by a destination device according to an embodiment. The process 700 may be performed at least in part by the destination device 220 described above in connection with FIG. 2. The process 700 involves receiving a 24-bit frame including transparency information as described herein. The destination device may perform color reordering and up-sampling of channel values at blocks 704 and 706. For example, Open GL Shader Language, or other graphics language, may be used to perform the reconstruction. In certain embodiments, one or more of the steps of the process 700 are performed by a graphics processor of the destination device.

In certain embodiments, the process 700 includes presenting the reconstructed 32-bit frame in some manner. For example, the reconstructed frame may be passed to a display pipeline that supports transparency. The transparent pixels of the original image may be transparent in the resulting picture, as desired.

Other Embodiments

Certain embodiments disclosed herein provide for embedding of transparency information within color data information of a frame corresponding to a pixel of video image content. Principles and functionality described in the present disclosure may be implemented by software and/or hardware components of computing devices. Certain disclosed functionality may be embodied in one or more software applications, such as, for example, software packages for constructing video image frames for transmission using H.264 decoders/encoders.

Those skilled in the art will appreciate that in some embodiments, other types of transparency communication systems and/or programming schemes can be implemented. In addition, the actual steps taken in the processes discussed herein may differ from those described or shown in the figures. Depending on the embodiment, certain of the steps described above may be removed, others may be added.

Reference throughout this specification to "some embodiments," "certain embodiments" or "an embodiment" means that a particular feature, structure or characteristic described in connection with the embodiment is included in at least some embodiments. Thus, appearances of the phrases "in some embodiments," "in certain embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Methods and processes described herein may be embodied in, and partially or fully automated via, software code modules executed by one or more general and/or special purpose computers. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of computer-readable medium or other computer storage device. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with patients, health care practitioners, administrators, other systems, components, programs, and so forth.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method comprising:
   by a controller including a non-transitory memory:
   accessing a first frame of digital data associated with a pixel of an image representation, the frame consisting of a first number of bits of data and comprising:
   a set of transparency data bits representative of transparency information associated with the pixel;
   a set of x number of red data bits representative of red color information associated with the pixel;
   a set of green data bits corresponding to green color information associated with the pixel; and
   a set of blue data bits corresponding to blue color information associated with the pixel,
   wherein the set of transparency bits within the frame are distinct from each of the set of x number of red data bits, the set of green data bits and the set of blue data bits;
   constructing a second frame of digital data associated with the pixel, the frame consisting of a second number of bits of data and comprising:
   a single transparency data bit of the set of transparency data bits;
   a reduced set of red data bits contiguous with the single transparency bit and consisting of (x−1) number of bits of the set of red data bits;
   the set of green data bits; and the set of blue data bits; and
   providing the second frame of digital data to a destination device; wherein the second number is less than the first number.

2. The method of claim 1, wherein the set of transparency data, the set of red data bits, the set of green data bits, and the set of blue data bits each consist of 8 bits of data.

3. The method of claim 1, wherein the (x−1) bits of the set of red data bits correspond to (x−1) number of most-significant bits of the set of red data bits, and the single transparency bit and the reduced set of red data bits form a byte of data with the single transparency bit located in the most significant bit position of the byte.

4. The method of claim 1, wherein the set of transparency data bits is contiguous with the set of red data bits within the first frame.

5. The method of claim 1, wherein constructing the second frame comprises right shifting the set of x number of red data bits by one position, thereby reducing a number of red data bits by one bit.

6. The method of claim 5, wherein constructing the second frame further comprises right shifting the set of transparency data bits by seven positions, thereby reducing a number of transparency data bits by seven.

7. The method of claim 1, further comprising setting the set of transparency data bits to a maximum or minimum bit value prior to constructing the second frame.

8. The method of claim 1, further comprising encoding the second frame according to H.264 compression format.

9. The method of claim 8, wherein said encoding is performed using an encoder device that does not implement extensions supporting transmission of transparency information.

10. The method of claim 1, wherein the first and second frames correspond to digital overlay content.

11. The method of claim 1, wherein the controller is a component of a mobile computing device.

12. The method of claim 1, wherein the first number is 32 and the second number is 24.

13. The method of claim 12, wherein the one or more additional transparency data bits each have a same value as the transparency data bit.

14. The method of claim 12, wherein the set of transparency data, the increased set of red data bits, the set of green data bits, and the set of blue data bits each consist of 8 bits of data.

15. The method of claim 12, wherein the one or more additional transparency data bits consists of 7 bits.

16. The method of claim 12, wherein the one or more additional red data bits consists of 1 bit.

17. The method of claim 1, wherein the first number is 24 and the second number is 32.

18. A method comprising:
by a controller including a non-transitory memory:
receiving a first frame of digital data associated with a pixel of an image representation, the frame consisting of a first number of bits of data and comprising:
a transparency data bit representative of transparency information associated with the pixel;
a set of red data bits contiguous with the transparency data bit and representative of red color information associated with the pixel;
a set of green data bits representative of green color information associated with the pixel; and
a set of blue data bits representative of blue color information associated with the pixel;
constructing a second frame of digital data associated with the pixel, the frame consisting of a second number of bits of data and comprising:
a set of transparency data bits including the transparency data bit and one or more additional transparency data bits;
an increased set of red data bits including the set of red data bits and one or more additional red data bits; the set of green data bits; and
the set of blue data bits,
wherein the set of transparency bits within the frame are distinct from each of the increased set of red data bits, the set of green data bits and the set of blue data bits; and
causing the second frame of digital data to be displayed on a digital display device; wherein the second number is greater than the first number.

19. A system comprising:
a source computing device; and
a destination computing device;
wherein the source computing device is configured to:
access a first frame of digital data consisting of four bytes of data and comprising a byte of transparency data, a byte of red data, a byte of green data, and a byte of blue data, wherein the byte of transparency data within the frame are distinct from each of the byte of red data, the byte of green data and the byte of blue data;
construct a second frame consisting of three bytes of data and comprising a bit of transparency data, seven bits of red data contiguous with the bit of transparency data, the byte of green data, and the byte of blue data;
encode the second frame using an encoder; and
provide the second frame of digital data to the destination computing device;
wherein the destination computing device is configured to:
receive the second frame of digital data;
decode the second frame using a decoder;
construct a third frame consisting of four bytes of data and comprising a reconstructed byte of transparency data, a reconstructed byte of red data, the byte of green data, and the byte of blue data; and cause the third frame to be displayed on a digital display device.

20. The system of claim 19, wherein the encoder and/or decoder are substantially closed to external access.

* * * * *